US008223235B2

(12) United States Patent
John

(10) Patent No.: US 8,223,235 B2
(45) Date of Patent: Jul. 17, 2012

(54) DIGITAL IMAGER WITH DUAL ROLLING SHUTTERS

(75) Inventor: George C. John, Arlington Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 905 days.

(21) Appl. No.: 11/956,033

(22) Filed: Dec. 13, 2007

(65) Prior Publication Data

US 2009/0153710 A1 Jun. 18, 2009

(51) Int. Cl.
*H04N 5/335* (2011.01)
*H04N 5/228* (2006.01)
*H04N 9/32* (2006.01)

(52) U.S. Cl. ............... 348/296; 348/222.1; 382/295

(58) Field of Classification Search .......... 348/296, 348/222.1; 382/295
See application file for complete search history.

(56) References Cited

U.S. PATENT DOCUMENTS

| | | | |
|---|---|---|---|
| 5,157,742 A | 10/1992 | Niihara | |
| 5,210,559 A | 5/1993 | Ohki | |
| 5,253,071 A | 10/1993 | MacKay | |
| 5,410,347 A | 4/1995 | Steinle et al. | |
| 5,576,772 A | 11/1996 | Kondo | |
| 5,623,305 A | 4/1997 | Ishizuka et al. | |
| 5,842,054 A | 11/1998 | Suzuki et al. | |
| 5,946,032 A | 8/1999 | Ishizuka et al. | |
| 5,966,173 A | 10/1999 | Inuiya et al. | |
| 6,009,336 A | 12/1999 | Harris et al. | |
| 6,154,519 A | 11/2000 | Florent et al. | |
| 6,567,469 B1 | 5/2003 | Rackett | |
| 6,618,173 B1 | 9/2003 | Nobel et al. | |
| 6,642,964 B1 | 11/2003 | Perregaux et al. | |
| 6,760,485 B1 | 7/2004 | Gilman et al. | |
| 6,801,250 B1 | 10/2004 | Miyashita | |
| 6,934,332 B1 | 8/2005 | Auyeung et al. | |
| 6,961,157 B2 | 11/2005 | Tandon et al. | |
| 7,046,401 B2 | 5/2006 | Dufaux et al. | |
| 7,061,524 B2 | 6/2006 | Liu et al. | |
| 7,164,496 B2 | 1/2007 | Tatsumi | |
| 7,236,190 B2 | 6/2007 | Yanof et al. | |
| 7,251,057 B2 | 7/2007 | Tsujino et al. | |
| 7,397,503 B2 * | 7/2008 | Baer et al. | 348/226.1 |
| 7,433,538 B2 | 10/2008 | Kusakabe et al. | |
| 7,443,548 B2 | 10/2008 | Sprague et al. | |

(Continued)

FOREIGN PATENT DOCUMENTS

JP 2006-148621 A 6/2006

(Continued)

OTHER PUBLICATIONS

The State Intellectual Property Office of the People's Republic of China, "Notification of the First Office Action" for Application No. 200780024084.0 Sep. 30, 2010, 12 pages.

(Continued)

*Primary Examiner* — Chieh M Fan
*Assistant Examiner* — Quang Le

(57) ABSTRACT

A method of forming an image of a moving object is provided. The method includes capturing a first digital image of a moving object using a first rolling shutter scanning in a first direction. Likewise, a second digital image of the moving object is captured using a second rolling shutter scanning in a second direction different from the first direction. The first and second digital images are processed to form a composite digital image of the moving image.

15 Claims, 3 Drawing Sheets

U.S. PATENT DOCUMENTS

| | | | |
|---|---|---|---|
| 7,446,907 B2 | 11/2008 | Hosier et al. | |
| 7,557,832 B2 | 7/2009 | Lindenstruth et al. | |
| 7,564,482 B2 * | 7/2009 | Clarke et al. | 348/208.1 |
| 7,830,565 B2 | 11/2010 | John | |
| 2002/0122133 A1 | 9/2002 | Ejima | |
| 2002/0181033 A1 | 12/2002 | Tandon et al. | |
| 2004/0109069 A1 | 6/2004 | Kaplinsky et al. | |
| 2004/0212858 A1 | 10/2004 | Hosier et al. | |
| 2004/0223075 A1 | 11/2004 | Furlan et al. | |
| 2004/0233295 A1 | 11/2004 | Hoshuyama | |
| 2005/0007460 A1 * | 1/2005 | Stavely et al. | 348/222.1 |
| 2006/0072018 A1 | 4/2006 | Inaba et al. | |
| 2006/0109373 A1 | 5/2006 | Kurane | |
| 2006/0119721 A1 | 6/2006 | Blerkom | |
| 2006/0204062 A1 * | 9/2006 | Shigeta | 382/124 |
| 2006/0238632 A1 | 10/2006 | Shah | |
| 2006/0271456 A1 | 11/2006 | Romain et al. | |
| 2007/0147706 A1 * | 6/2007 | Sasaki et al. | 382/295 |
| 2007/0154202 A1 * | 7/2007 | Lee et al. | 396/153 |
| 2007/0206238 A1 | 9/2007 | Kawai | |
| 2007/0206945 A1 * | 9/2007 | DeLorme et al. | 396/332 |

FOREIGN PATENT DOCUMENTS

WO    02/19030 A1    3/2002

OTHER PUBLICATIONS

Japanese Patent Office, "Office Action" for Application No. 2009-516604 Apr. 28, 2011, 6 pages.

* cited by examiner

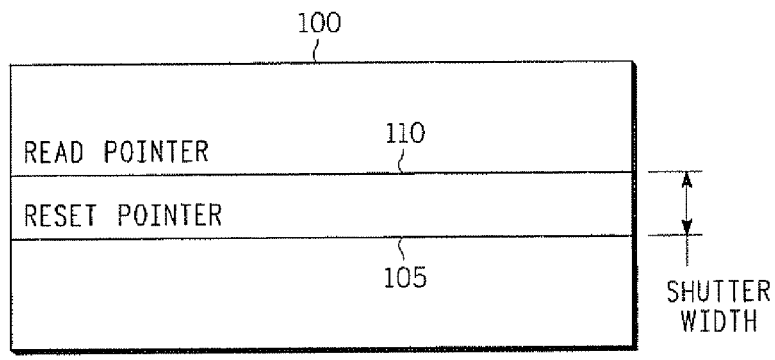
FIG. 1 -PRIOR ART-
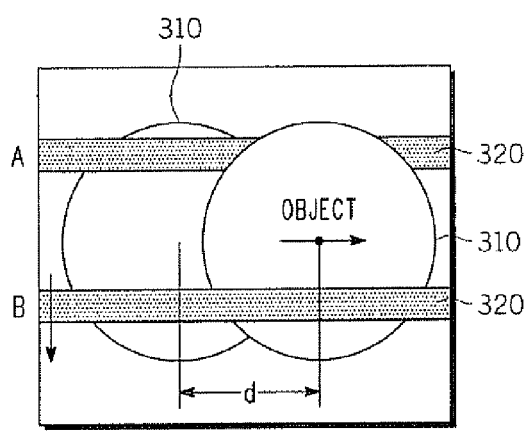
FIG. 3
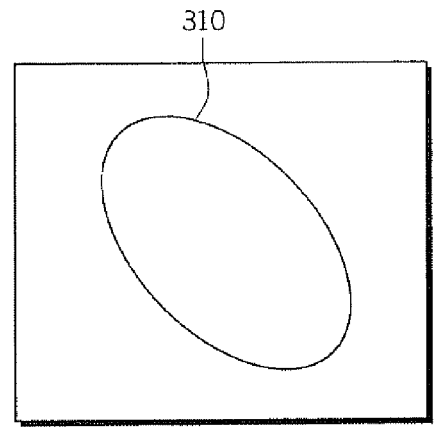
FIG. 4
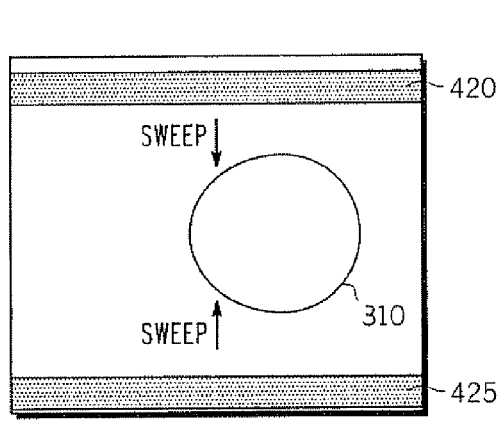
FIG. 5
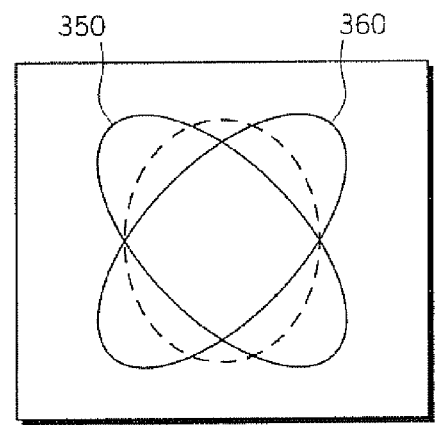
FIG. 6

DIGITAL IMAGER WITH DUAL ROLLING SHUTTERS

FIELD OF THE INVENTION

The invention relates generally to digital imagers, and more particularly to a digital imager with a rolling shutter.

BACKGROUND OF THE INVENTION

Digital cameras or imagers sample the original light that bounces off a subject to create a digital image. A digital camera may use a shutter in combination with a sensor to determine an exposure time and acquire the proper amount of light to capture a good image. The proper amount of light may come from accumulating ambient light over time until the proper amount of light is obtained to accurately render the chrominance and luminance in the image.

In many digital CMOS imagers employing pixel arrays the optical integration time is controlled by the method known as "rolling shutter". This approach utilizes at least two pointers, Reset and Read, that continuously move through the pixel array image frame from top to bottom by moving from row to row at predefined intervals. First, the Reset pointer 105 starts the integration for all pixels in the line. Some time later the Read pointer 110 reaches the same line and initiates signal readout. This is illustrated in FIG. 1, which depicts a pixel array 100. The distance in lines between the two pointers is referred to as shutter width 115. Shutter width multiplied by the line scan time gives the duration of the optical integration time. The exposure time can thus be adjusted by varying the shutter width.

The use of a "rolling shutter" approach allows an equal optical integration time for all pixels in an image frame to be achieved. However, when moving objects are being imaged, the rolling shutter can lead to artifacts. In the time it takes the shutter to move across the entire pixel array, the objects can change position, thereby distorting the resulting image. This problem can be overcome by using a global shutter in which all the pixels are exposed simultaneously. Unfortunately, this introduces a delay in reading out the data from the pixels. This delay can create problems when a very small time interval is needed between acquisition of successive images or when a fast frame rate is needed.

BRIEF DESCRIPTION OF THE DRAWINGS

FIG. 1 shows a pixel array that employs a conventional rolling shutter.

FIG. 3 shows a moving object that is to be captured by the rolling shutter of the digital imager.

FIG. 4 shows the resulting image for the scene in FIG. 3 when captured by the digital imager using a single rolling shutter.

FIG. 5 shows a scene that is being captured by a digital imager that has two rolling shutters sweeping in different directions.

FIG. 6 shows the two images captured by the two rolling shutters in FIG. 5 superimposed on one another, along with the reconstructed image (dotted line).

DETAILED DESCRIPTION

Figure 2:
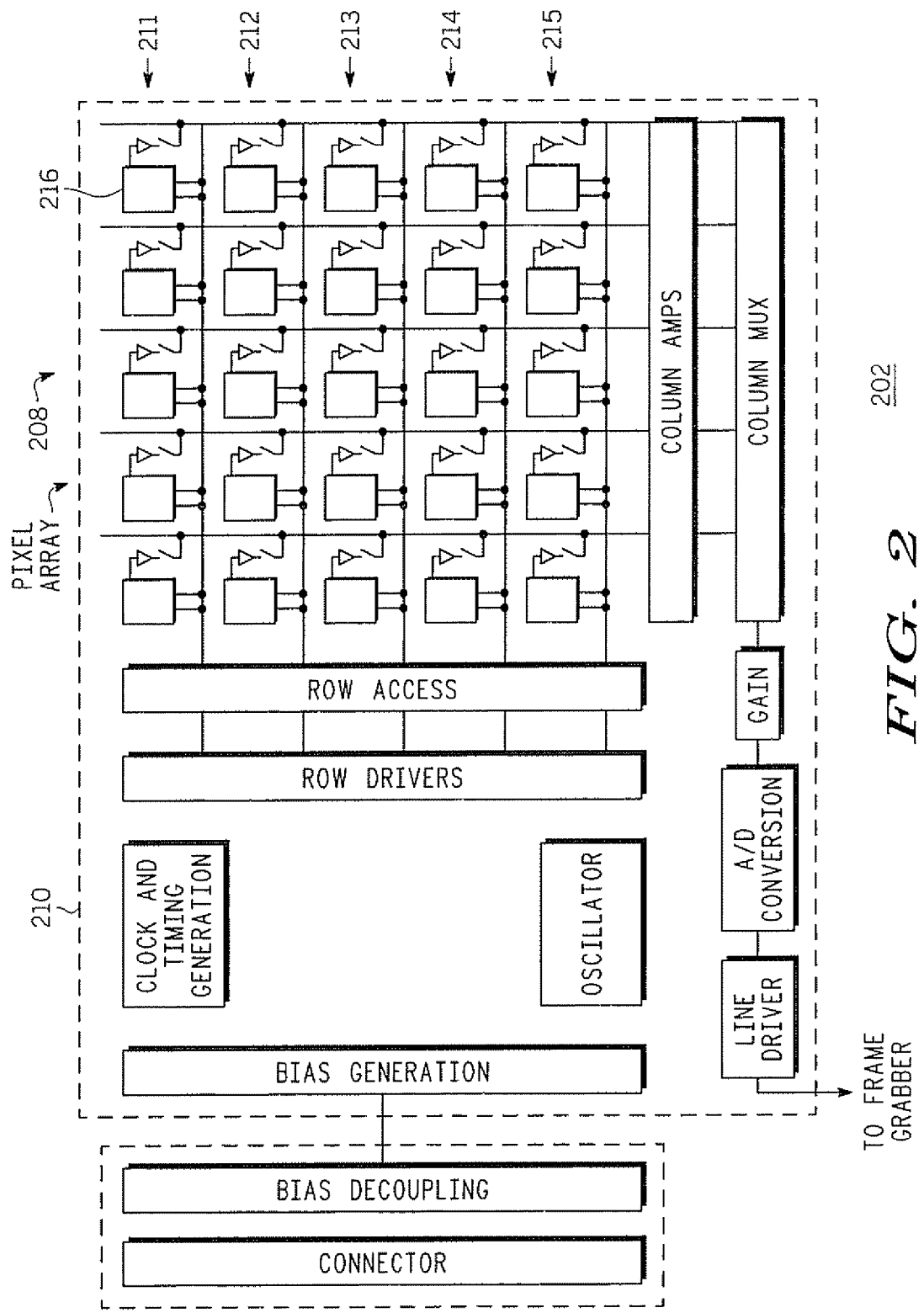
FIG. 2 illustrates a block diagram of one example of a digital imager.

FIG. 2 illustrates a block diagram of one example of a digital imager 202. In some cases the digital imager 202 may be incorporated in a digital camera (still and/or video), cellular telephone, PDA, or any other electronic device that includes functionality in addition to that of imaging. The imager 202 may include an array of pixels 208 and processing circuitry 210 to direct the operation of the pixels. The pixels may be organized into rows or lines of pixels 211-215 aligned horizontally across the light sensitive portion of the sensor 202. Each pixel, such as a first pixel 216, acts as an optoelectric converter or photosensor that becomes electrically charged to a level directly proportional to the amount of light that strikes the pixel during a given time period, called the integration time. The pixels may be, for example, CMOS or CCD pixels. Each pixel in the array 208 may have its own amplifier and output circuitry to allow each pixel to be read out independently of the other pixels.

The processing circuitry 210 directs the overall integration time and specifies the time when each pixel should start tracking the accumulated light striking that pixel. The processing circuitry 210 includes a rolling shutter timing mechanism to control the exposure time for the rows of pixels 211-215 in the imager 202. The accumulated charge from light striking each pixel in the array 208 may be read out row by row. After a row is read out completely, that row may be put into a reset state. Thus, the pixel array 208 captures an image by converting light received from objects in a scene into an electrical charge that is stored by the pixels in the pixel array 208. The amount of the electrical charge stored by each pixel depends on the amount of the light that falls on the imager, both in terms of intensity and duration.

FIG. 3 shows a scene that is to be captured by the imager 202. A moving object 310 is shown in the scene. For simplicity, but without any loss of generality, the moving object is shown as having circular symmetry and a direction of motion along the x-axis. More generally the principles illustrated herein are applicable to all objects regardless of shape or degree of symmetry or their direction of motion. A rolling shutter 320 is shown superimposed over the scene. The rolling shutter in this example sweeps across the scene from top to bottom. The position of the shutter is shown at two different times during the exposure process. At time t1 the shutter 320 is shown at position A along the y axis and at a later time t2 the shutter 320 is shown at position B along the y axis. During the time the shutter has swept from position A to B, the object 310 has moved by a distance d along the x axis.

Because of the movement of the object 310 and the sweep of the shutter 320 the captured image will be distorted. For the particular scene and shutter arrangement shown in FIG. 3, the resulting image will appear as shown in FIG. 4, in which the originally circular object 310 has become elongated. As detailed below, this problem can be overcome with the use of two rolling shutters that sweep in opposite directions from one another. As demonstrated below, this results in the acquisition of two separate images in which any moving objects in the image are distorted in opposite directions. The magnitude of the distortion can be determined in both the x and y directions from the two images. Once the magnitude of the distortion in each direction is known, it can be readily corrected or compensated to produce an image in which the distortion is eliminated. Of course, in some cases it may not be desirable to eliminate some or all of the distortion. In fact, some distortion may be intentionally added for the purpose of creating special effects and the like.

FIG. 5 shows a scene that is being captured by a digital imager that has two rolling shutters 420 and 425 that are sweeping in different directions. In this example shutter 420 is sweeping from top to bottom and shutter 425 is sweeping from bottom to top. Of course, the shutters 420 and 425 may sweep in other directions as well (e.g., from left to right and right to left, respectively), provided that they sweep in different directions from one another. In the example shown herein the different directions in which the rolling shutters 420 and 425 sweep are opposite from one another. In FIG. 5 the imager is once again capturing the moving object 310 shown in FIG. 3.

Figure 8:
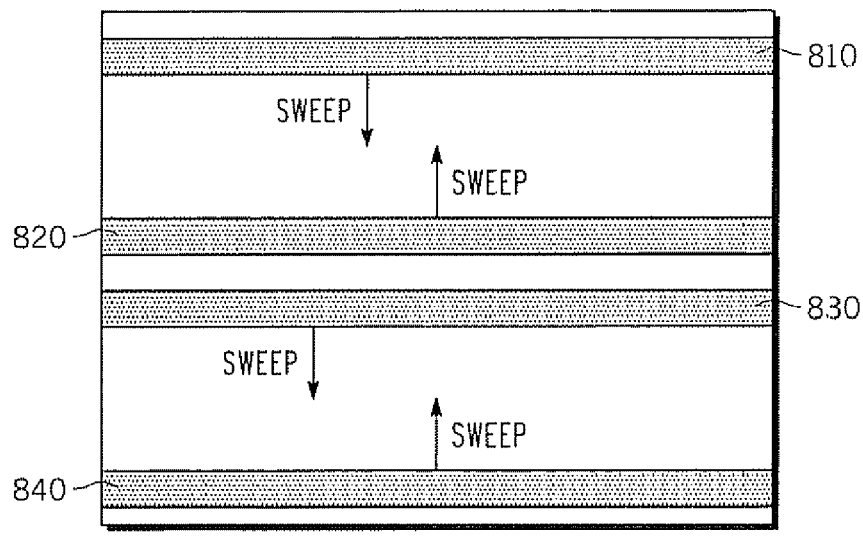
FIG. 8 shows a scene that is being captured by a digital imager that has four rolling shutters.

Of course, in some cases more than two rolling shutters may be employed. For instance, in one example four shutters may be used, each of which scans in a different direction. In particular, the shutters may be initially located at the periphery of a circular image and positioned at 1, 5, 7 and 11 o'clock and sweep inward toward the center of the image. Another example employing four rolling shutters is depicted in FIG. 8. In this example not all the shutters scan in a different direction. In FIG. 8, one rolling shutter 810 sweeps only half of the frame from top to the middle, one rolling shutter 820 sweeps only half the frame from the middle to the top, one rolling shutter 830 sweeps half of the frame from the middle to the bottom, and one rolling shutter 840 sweeps half of the frame from the bottom to the middle. In this example the various individually acquired images can be merged in a variety of different ways to reduce or eliminate distortion using any appropriate technique, several of which are mentioned below. When merging the individual images, the top half of the image may first be formed (by merging the images from shutters 810 and 820) and the bottom half of the image may be formed (by merging the images from shutters 830 and 840). After the top and bottom images have been formed in this manner, the two halves can be merged to form the complete image. Alternatively, a first image can be formed by merging the image from shutter 810 with the image from shutter 830 and a second image can be formed by merging the image from shutter 840 with the image from shutter 820, after which the final composite image can be formed by merging the first and second images.

In yet another example employing four rolling shutters, one rolling shutter sweeps the entire frame from top to bottom, one rolling shutter sweeps the entire frame from bottom to top, one rolling shutter sweeps the entire frame from left to right, and one rolling shutter sweeps the entire frame from right to left. All four full images can then be merged to form one undistorted image using techniques such as those mentioned below. Referring again to FIG. 2, the processing circuitry 210 in imager 202 can implement a timing mechanism for a dual rolling shutter such that two pairs of Reset and Read pointers associated with different shutters can simultaneously track the accumulation of charge and read out a signal from the pixels in a row by row manner. The beginning of the integration time for each pixel is the period of time during which the pixel begins the accumulation of charge by converting light. The lines/rows of pixels 211-215 in the imager 202 begin the integration time in sequence. For the first rolling shutter (e.g., shutter 420 in FIG. 5) the pixel array 208 accumulates light from the objects in the scene starting at the top of the image and proceeds row by row to the bottom of the image. When the integration process has moved some distance down the image, the readout process of lines of pixels begins. The lines of pixels 211-215 are read out in sequence, starting at the top of the image and proceeding row by row to the bottom. The time period that begins when a first row of pixels 211 starts the accumulation of charge and ends when a last row of pixels 215 starts to be read is the integration time. While this process is being performed for the first shutter, a similar process is performed for the second shutter (e.g., shutter 425 in FIG. 5), but proceeding along the pixel array 208 in the opposite direction. It should be noted that the different shutters may perform the integration process in identical, overlapping, or distinct (i.e., non-overlapping) time periods.

After the two complementary images have been acquired by the dual shutters (or as soon as the shutters 420 and 425 cross each other) any of a wide variety of image registration or feature extraction algorithms may be used to detect the presence of moving objects in the two images and to form a composite image in which distortion of the moving object is eliminated. These techniques can largely remove the distortion using as an input parameter the scanning speed of the opposite-going rolling shutters 420 and 425. For example, feature extraction may be used to locate the edges of the moving object in the two images, and, by knowing the speed of the shutter sweep, the amount of distortion of the edges can be determined. New edge points can be determined by correcting for the distortion, after which the two images can then be merged to form a composite distortion reduced image using appropriate registration, interpolation and/or mosaicking techniques.

A simplified, intuitive procedure will be applied to the circular moving object shown in FIG. 3 to illustrate in principle how information extracted from two complementary images acquired in the two scans can be used to form a single undistorted image. This procedure is presented for purposes of illustration because of its simplified, intuitive nature. In practice, however, more mathematically complex techniques such as those mentioned above are more likely to be used because of the relatively large amount of processing power that can be made available in the processing circuitry 210 of the digital imager. This procedure will be illustrated with reference to FIG. 6, in which the elongated object captured in each of two images are superimposed on one another. The object 350 represents the object taken using shutter 420 as it sweeps from top to bottom (compare to FIG. 4) and the object 360 represents the object taken using shutter 425 as it sweeps from bottom to top. As previously mentioned, the objects 350 and 360 exhibit distortions that are oppositely directed from one another.

Removal of object distortion in FIG. 6 can be more easily understood by separately considering the distortions arising in the x and y directions. For this purpose the direction of sweep of the two shutters 420 and 425 is taken to be in the y direction (i.e., along the y axis). The distortion arising in the x direction (i.e., along the x axis) will be considered first.

When the two shutters 420 and 425 meet at the center of the image as their respective sweeps progress, they will both capture the object in the same position along the x axis. Accordingly, the centermost point on object 350 will correspond to centermost point on object 360. As one moves away from the center of the objects along the x direction, the corresponding points on the two objects 350 and 360 increasingly diverge from one another. In general, given a particular point on object 350 and its corresponding point on object 360, the same point on the undistorted object along the x axis will be located between the points on the objects 350 and 360. Its precise location can be readily calculated given the sweep speed of the shutters and the difference in time between when the point was captured on object 350 and when it was captured on object 360. This process can be repeated for every point on the object in the x direction. In this way, the location of a point on the distorted object 350 and its corresponding point on the distorted object 360 can be used to calculate the actual location of the point on the undistorted object.

A similar process to that described above can be used to calculate the proper position of each point on the undistorted object in the y-direction. However, whereas in this example the undistorted object only undergoes a spatial displacement in the x-direction with respect to the objects 350 and 360 captured in each of the complementary images, in the y-direction the objects 350 and 360 undergoes a length distortion. This is because motion along the shutter sweep direction will appear elongated, while the motion against the shutter sweep direction will appear compressed. Accordingly, the process in the y-direction is used to calculate the undistorted length of the object in the y-direction. The resulting undistorted object that arises from computing the proper position of each point in the x and y directions is represented by the dashed line in FIG. 6.

So far only the moving object itself has been considered. The background portion of the image in which the object moves is assumed to be stationary and is largely captured in both images. However, different portions of the background may be missing from the individual images since these portions were hidden by the moving object in the foreground. Accordingly, when the undistorted object is calculated and placed in the final image, portions of the background that are now visible may be missing from one of the images. This missing information can be easily obtained. Specifically, the background information missing from one of the captured images can be found in the other of the captured images.

Figure 7:
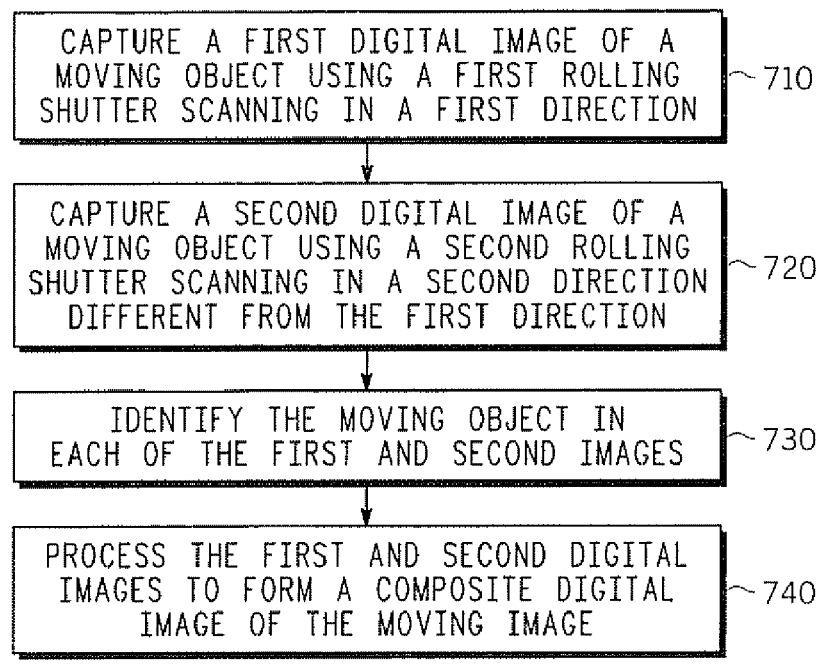
FIG. 7 is flowchart showing one example of a method used by an imager having two rolling shutters to form an image of a moving object.

FIG. 7 is flowchart showing one example of a method used by the imager 202 to form an image of a moving object. The method begins in step 710 by capturing a first digital image of a moving object using a first rolling shutter scanning in a first direction. The method continues in step 720 by capturing a second digital image of a moving object using a second rolling shutter scanning in a second direction different from the first direction. The moving object is identified in each of the first and second images using image registration techniques in step 730. In step 740 the first and second digital images are processed to form a composite digital image of the moving image. The digital images may be processed to remove distortion of the moving object.

The processes described above, including but not limited to those presented in connection with the processing circuit 210 that receives the image data from the pixel array 208 may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

The invention claimed is:

1. A method of forming an image of a moving object, comprising:
    capturing a first digital image of the moving object within a scene using a first rolling shutter scanning in a first direction across a portion of the scene at a first sweep speed;
    capturing a second digital image of the moving object within the scene using a second rolling shutter scanning in a second direction across the portion of the scene at a second sweep speed, the second direction different from the first direction;
    processing the first and second digital images to form a composite digital image of the moving image using the first sweep speed and the second sweep speed; and
    capturing a third digital image of the moving object using a third rolling shutter scanning in a third direction different from the first and second directions.

2. The method of claim 1 wherein the first and second digital images are processed to remove distortion of the moving object.

3. The method of claim 2 wherein the processing to remove distortion comprises identifying the moving object in each of the first and second images using image registration.

4. The method of claim 1 wherein the processing is performed using as input data only the first and second images and the first sweep speed of the first rolling shutter and the second sweep speed of the second rolling shutter.

5. The method of claim 1 wherein the second direction is opposite to the first direction.

6. The method of claim 1 wherein the first and second rolling shutters sequentially read out selected rows of integrated pixels in the first and second directions, respectively, along a pixel array.

7. The method of claim 1 wherein the first and second digital images are captured in overlapping periods of time.

8. The method of claim 1 wherein the first and second digital images are captured in common periods of time.

9. An image processing device, comprising:
    a digital image sensor having first and second rolling shutters configured to scan a portion of an image in a first direction using the first rolling shutter at a first sweep speed and to scan the portion of the image and in a second direction, different from the first direction, using the second rolling shutter at a second sweep speed; and
    a processor configured to form a composite digital image from first and second images respectively captured using the first and second rolling shutters and to process the composite digital image using the first sweep speed and the second sweep speed,
    wherein the digital image sensor includes at least a third rolling shutter that is configured to scan the image in a direction different from the first and second rolling shutters.

10. The image processing device of claim 9 wherein the processor is further configured to remove distortion of a moving object included in the composite digital image.

11. The image processing device of claim 9 wherein the image processing device is incorporated in one of a digital camera or a cellular telephone.

12. The image processing device of claim 9 wherein the digital image sensor is a CMOS pixel array.

13. The image processing device of claim 9 wherein the first and second rolling shutters are implemented by a rolling shutter circuit operationally coupled to the pixel array.

14. A non-transitory computer-readable medium encoded with instructions which, when executed by a processor, performs a method including:
    capturing a first digital image of the moving object within a scene using a first rolling shutter scanning in a first direction across a portion of the scene at a first sweep speed;
    capturing a second digital image of the moving object within the scene using a second rolling shutter scanning in a second direction across the portion of the scene at a second sweep speed, the second direction different from the first direction;

processing the first and second digital images to form a composite digital image of the moving image using the first sweep speed and the second sweep speed; and capturing a third digital image of the moving object using a third rolling shutter scanning in a third direction different from the first and second directions.

15. The non-transitory computer-readable medium of claim 14 wherein the first and second digital images are processed to remove distortion of the moving object.

* * * * *